US006970543B2

(12) United States Patent
Lautenschlager et al.

(10) Patent No.: US 6,970,543 B2
(45) Date of Patent: Nov. 29, 2005

(54) METHOD AND DEVICES FOR CALL IDENTIFICATION

(75) Inventors: Wolfgang Lautenschlager, Weissach-Flacht (DE); Hartmut Weik, Stuttgart (DE)

(73) Assignee: Alcatel, Paris (FR)

( * ) Notice: Subject to any disclaimer, the term of this patent is extended or adjusted under 35 U.S.C. 154(b) by 335 days.

(21) Appl. No.: 09/985,242

(22) Filed: Nov. 2, 2001

(65) Prior Publication Data

US 2002/0061096 A1    May 23, 2002

(30) Foreign Application Priority Data

Nov. 18, 2000 (DE) ................................ 100 57 247

(51) Int. Cl.⁷ .............................................. H04M 1/56
(52) U.S. Cl. ........................... 379/142.04; 379/142.01; 379/142.06
(58) Field of Search ...................... 379/142.01, 142.04, 379/142.06, 142.17, 88.12, 88.11, 88.19, 379/88.21, 211.01, 221.09, 93.17, 93.23; 455/414, 415; 370/407

(56) References Cited

U.S. PATENT DOCUMENTS

| 4,720,848 | A |   | 1/1988  | Akiyama |
|-----------|---|---|---------|---------|
| 4,899,358 | A |   | 2/1990  | Blakley |
| 5,559,860 | A | * | 9/1996  | Mizikovsky ................. 455/413 |
| 5,761,279 | A | * | 6/1998  | Bierman et al. .......... 379/93.23 |
| 5,764,731 | A | * | 6/1998  | Yablon .................... 379/88.15 |
| 5,784,444 | A | * | 7/1998  | Snyder et al. .......... 379/142.01 |
| 5,864,612 | A | * | 1/1999  | Strauss et al. .......... 379/142.03 |
| 5,907,604 | A | * | 5/1999  | Hsu ....................... 379/142.06 |
| 5,999,599 | A | * | 12/1999 | Shaffer et al. ............ 379/93.23 |
| 6,094,587 | A | * | 7/2000  | Armanto et al. ............. 455/567 |
| 6,343,120 | B1 | * | 1/2002 | Rhodes ................... 379/142.01 |
| 6,446,127 | B1 | * | 9/2002 | Schuster et al. ............ 709/227 |
| 6,707,897 | B2 | * | 3/2004 | Nishida ....................... 379/188 |
| 6,711,402 | B1 | * | 3/2004 | Chelliah et al. ............. 455/415 |
| 2002/0054675 | A1 | * | 5/2002 | Brooks ................... 379/210.02 |

* cited by examiner

Primary Examiner—Curtis Kuntz
Assistant Examiner—Barry W Taylor
(74) Attorney, Agent, or Firm—Sughrue Mion, PLLC (57) ABSTRACT

The invention concerns a method for identifying the call of a subscriber calling, via a telecommunication network, a destination telecommunication device, in particular, a destination terminal of a called subscriber, a destination program module for it, a destination telecommunication device for it, a network device program module for it, a network device for it, a source program module for it and a source telecommunication device for it. According to the method, upon setup of a call connection, identification data for identification of the caller is transmitted to the destination telecommunication device. The destination telecommunication device outputs the identification data. It is proposed that the destination telecommunication device receives the identification data within a call setup signalling message and that the destination telecommunication device outputs the identification data, or output data generated from it, as acoustic and/or visual and/or mechanical call signals instead of an acoustic ringer tone selected by the destination telecommunication device.

20 Claims, 3 Drawing Sheets

METHOD AND DEVICES FOR CALL IDENTIFICATION

BACKGROUND

The invention is based on a priority application DE 100 57 247.2 which is hereby incorporated by reference.

The present invention concerns a method for identifying the call of a subscriber calling, via a telecommunication network, a destination telecommunication device of a called subscriber, a destination program module for it, a destination telecommunication device for it, a network device program module for it, a network device for it, a source program module for it and a source telecommunication device for it.

In the setup of a call connection via a telecommunication network, for example, a circuit-switched public line-conducted and/or mobile telecommunication network, the respective call is generally signalled acoustically to the called subscriber by his destination telecommunication device, e.g. by his telephone terminal, by a ringer tone or a call melody. Furthermore, in modern ISDN or mobile radio telephony terminals (ISDN=integrated services digital network), and in the case of some analog terminals, the call number of the caller is shown on a display, so that the called subscriber receives information for identifying the caller. The call number is transmitted to the destination telecommunication device of the called subscriber upon setup of the call connection as identification data for identification of the caller. The destination telecommunication device receives the call number in a so-called CLI message in conjunction with the setup of the call connection (CLI=calling line identifier). Following the sounding of the acoustic signalling, however, the called subscriber must first look at the display to receive the information for identification of the caller.

In the case of many terminals, a call melody or a ringer sequence can be selected or entered individually, so that a called subscriber can recognized from the respective acoustic signal that his terminal, and not the terminal of a person in the vicinity, is being called. This configuration possibility is used particularly in the case of mobile radio telephony terminals. Likewise, however, in the case of an acoustic signalling individually configured on the terminal of the called subscriber, the latter must first look at the display on his terminal in order to determine the caller identified, if applicable, by means of a CLI message.

The object of the present invention, therefore, is to create a convenient identification of the call of a subscriber calling, via a telecommunication network, a destination telecommunication device of a called subscriber.

SUMMARY OF THE INVENTION

This invention is based on the concept that the destination telecommunication device, in particular, a destination terminal, receives the identification data within a call setup signalling message and outputs this or, if applicable, output data generated from it, as acoustic and/or visual and/or mechanical call signals instead of an acoustic call tone selected by the destination telecommunication device. Instead of the called subscriber hearing an arbitrary ringing tone or a call melody which, although they may each be specifically set on the called subscriber's terminal, nevertheless do not contain any indication of the source of the call, the incoming call is signalled through individual and personal signals which are assigned to the caller and are selected by the latter. The signals are preferably acoustic signals and contain, for example, a call melody or call sequence and/or a vibration alarm and/or an optical signalling, or any combination of these.

It is thus also possible for the identification data to instruct the destination telecommunication device to effect only an optical signalling and/or a vibration alarm, but no acoustic signalling, so that the called subscriber is made aware of the incoming call in a very discreet manner.

In any case, the identification data for call identification can be transmitted to the destination telecommunication device in a digital network, for example, an integrated services digital network, a mobile radio telephony network or a data network, in particular, the Internet, or other network, based on an Internet protocol, which is suitable for telecommunication, and evaluated by it for the purpose of signalling an incoming call, the identification data and, consequently, the quality of the signalling, being controlled by the caller.

Further advantageous developments of the invention are disclosed in the dependent claims and in the description.

Several variants are conceivable for the generation and transmission of the identification data:

The identification data for call identification can be transmitted directly from the source telecommunication device of the caller to the destination telecommunication device of the called subscriber, for example, in a call setup message.

The identification data can be entered in each case in the context of a call connection setup on the source telecommunication device and/or be stored in a memory of the source telecommunication device and be called up from the memory upon setup of a call connection.

It is also possible for a network device of the telecommunication network to send the identification data to the destination telecommunication device. For example, the network device could be an exchange and/or a so-called service control point (SCP) of a so-called intelligent network according to the specifications of the ITU (International Telecommunication Union) or a VoIP gateway (VoIP=voice over Internet protocol). Furthermore, the network device could also be, for example, a so-called media gateway controller, a so-called gatekeeper, a so-called call-server or a so-called soft switch.

The respective identification data to be transmitted by the network device is advantageously initiated by a request message which is sent to the network device by the source telecommunication device. The request message can be, for example, a call request message, containing the call number of the source telecommunication device, which the source telecommunication device sends to the telecommunication network. The network device then enters the identification data assigned to the call number in the call request message and sends this to the destination telecommunication device.

It is also possible that the identification data, or output data generated from it for the generation of call signals is stored, at least partially, in the destination telecommunication device and that it is specified in the call signalling message which identification data or output data for the output of the call signals is to be used by the destination telecommunication device for the purpose of signalling the incoming call signalled by the call signalling message.

The identification data and/or the call signalling message are advantageously provided for indicating a particular quality of the call connection, in particular, a priority of the call connection and/or an identification of the type of information to be sent in the course of the call connection. For example, in the case of an ordinary call connection to the destination telecommunication device, only optical call signals can be produced, whereas an acoustic signalling is also effected in the case of an urgent call connection.

In an advantageous variant of the invention, the identification data is segmented. In this way, it is possible for a first portion of the identification data to be sent first in a call setup signalling message directed to the destination telecommunication device and for the remaining identification data to be sent subsequently in one or more subsequent messages. In this way, even complex and extensive identification data, e.g. longer call melodies or voice messages, can easily be sent during call signalling.

The destination telecommunication device expediently commences output of the identification data immediately after receiving the first call setup signalling message, before it has yet received the complete identification data, preferably before receiving the subsequent message(s). The call signalling is then effected very rapidly and without delays.

In a particularly simple variant of the invention, the destination telecommunication device controls a ringer tone generator according to the specifications of the identification data and thereby advantageously generates a ringer sequence. However, the destination telecommunication device expediently controls a loudspeaker for the output of the identification data, in which case even more complex call melodies and/or voice messages transmitted by the caller for the purpose of call identification can be output.

The identification data can also be used by the destination telecommunication device for the purpose of filtering incoming calls. For example, the destination telecommunication device can signal a call from a first caller to the called subscriber so that it is readily perceivable, by outputting, e.g. to a loudspeaker, the identification data given in a call setup signalling message used to setup the call connection. In the case of a call from a second caller whose calls are not to be accepted, at least temporarily, the destination telecommunication device does not output any call signals and redirects the call, e.g. to a call answering system. In this case, the destination telecommunication device evaluates the identification data, given in the respective call setup signalling message, by which the first and second callers are identified.

Although, in a preferred embodiment of the invention, the destination telecommunication device is a (destination) terminal, it is also possible for the destination telecommunication device to be an exchange, in particular, a private exchange. The exchange does not itself directly output the respective identification data contained in a call setup signalling message, but outputs it to a terminal connected to it. The terminal can be a terminal which is not itself able directly to evaluate the identification data, e.g. an analog telephone. The exchange then converts the identification data into output data which can be output by the terminal, for example, a ringer tone sequence. It is also possible for the exchange and the terminal to communicate via a proprietary, possibly manufacturer-specific protocol which is applicable only between the exchange and terminals, adapted to the exchange, which are connected to it.

BRIEF DESCRIPTION OF THE DRAWINGS

The invention and its advantages are set forth below with reference to an embodiment example and with aid of the drawing.

Figure 1:
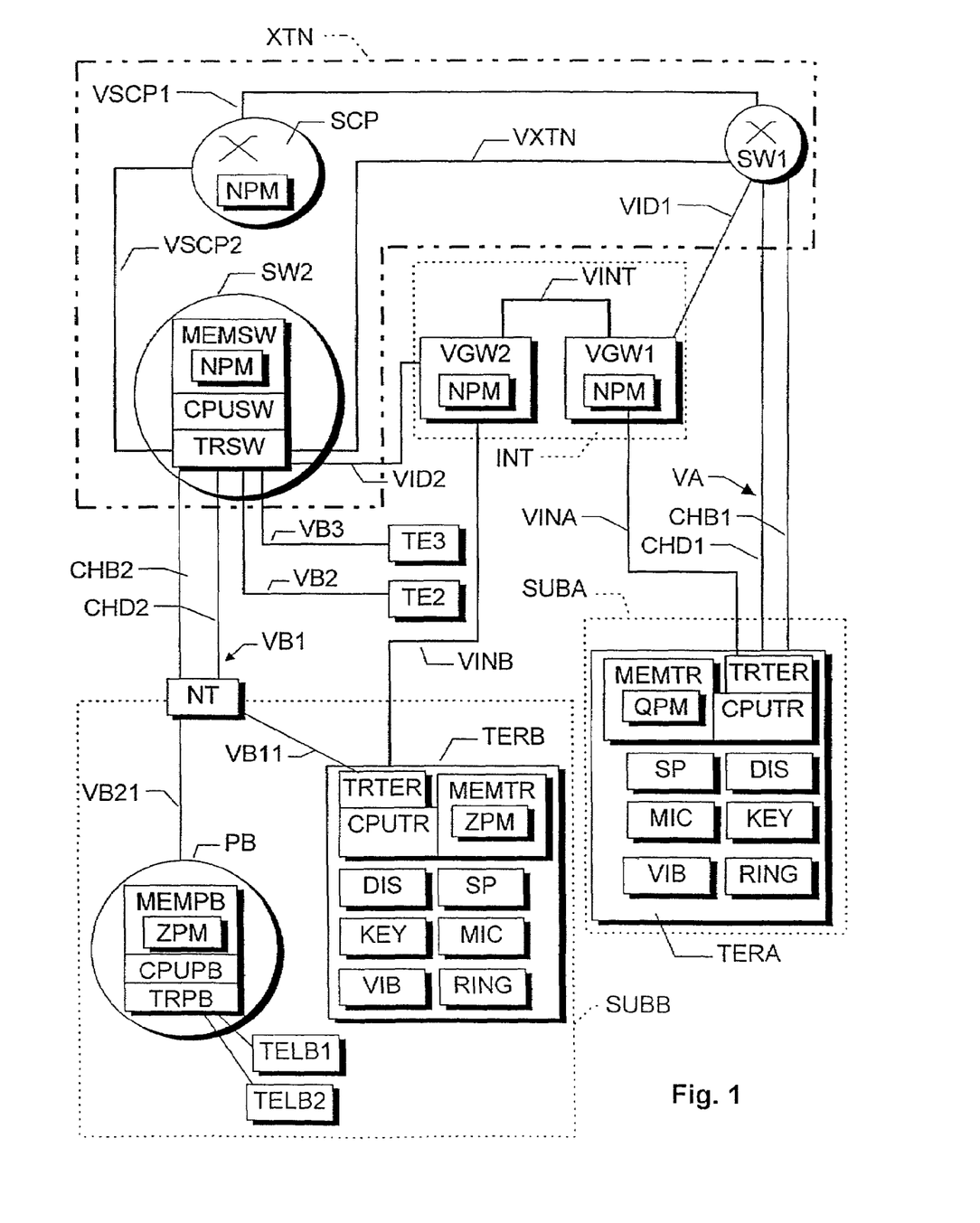
FIG. 1 shows an arrangement for the realization of the method according to the invention, with destination telecommunication devices TERA, PB according to the invention, network devices VGW1, VGW2, SCP and SW2 according to the invention, and a source terminal TERB according to the invention.

Represented in FIG. 1 is an illustrative arrangement with which the invention can be realized. FIG. 1 shows a circuit-switched telecommunication network XTN, as well as a data network INT, to which terminals TERA, TERB, TE2, TE3 and, via a private exchange PB, terminals TELB1 and TELB2 are connected. Call setup signalling messages with identification data for call identification can be sent to each of the connected terminals TERA, TERB, TE2, TE3, TELB1, TELB2 by the telecommunication network XTN and the data network INT. The connected terminals TERA, TERB, TE2, TE3, TELB1, TELB2 output the respective identification data, or output data generated from it, as acoustic and/or visual and/or mechanical call signals instead of another ringer tone.

The telecommunication network XTN can be, for example, an ISDN (integrated services digital network) telecommunication network or a mobile radio telephony telecommunication network, e.g. a GSM network (GSM =global system for mobile communication). In this case, the telecommunication network XTN is designed as a so-called intelligent network. Of the telecommunication network XTN, only the exchanges SW1, SW2, as well as a service control point SCP, are shown as examples for exchanges, network management systems, connection lines, etc. which are not depicted. The exchanges SW1, SW2 and the service control point SCP are embodiment examples for network devices according to the invention. The exchanges SW1, SW2 communicate with one another via a connection VXTN, and each communicates with the service control point SCP via a connection VSCP1 and VSCP2 respectively. The connections VXTN, VSCP1, VSCP2 are routed via devices of the telecommunication network XTN which are not depicted. The connection VXTN represents, by way of example, one or more connections with channels for useful data and channels for signalling data. The connections VSCP1, VSCP2 are connections which are preferably routed via a signalling channel or via a signalling network. For example, the central signalling system No.7 is such a signalling network.

In this case, the exchanges SW1, SW2 are so-called service switching points (SSP) and the service control node SCP is a so-called service control point (SCP) of an intelligent network. The basic functions of a service switching point and of a service control point are standardized by the ITU (International Telecommunication Union) and therefore need not be elaborated at this point.

The terminal TERA, serving as a source telecommunication device, is connected to the exchange SW1 via a subscriber line connection VA of a subscriber SUBA. Connected to the exchange SW2, via line-conducted and/or wireless subscriber line connections VB1, VB2, VB3, are the terminal TERB and the private branch exchange PB of a subscriber SUBB, as well as, in addition, the terminals TE2 and TE3 of subscribers who are not represented. The private branch exchange PB services the terminals TELB1 and TELB2 of the subscriber SUBB, who is indicated by a broken-line box. The terminals TE2, TE3, TELB1, TELB2 are, for example, line-conducted or cordless telephone sets or fax machines, for example, DECT terminals (DECT=digital enhanced cordless telecommunications). The exchange PB and the terminal TERB serve as destination telecommunication devices designed according to the invention. On the side of the subscriber SUBB, the subscriber line connection VB1 is terminated by a network terminator NT which, in this case, is a so-called ISDN NT adapter (NT=network terminator). Instead of the network terminator NT, several network terminators can also be provided, for example, a network terminator for the terminal TERB, terminating a so-called ISDN multiple connection, as well as a network terminator for the exchange PB, terminating a so-called system connection. These network terminators could also be contained in the network terminator NT.

The private branch exchange PB and the terminal TERB are connected to the network terminator NT via connections VB11 and VB21 which are established on, for example, a so-called internal, subscriber-side So bus. The terminals SW1, SW2 also service other subscriber line connections which are not depicted. Via the telecommunication network XTN, call connections and/or data connections can be set up between the terminals or private branch exchanges connected to it, e.g. between the terminals TERA and TERB.

The subscriber line connections VA, VB1 have channels CHB1 and CHB2 respectively provided for the transmission of useful data, for example, voice and/or image data, as well as channels CHD1 and CHD2 respectively, provided for control purposes. The channels CHD1, CHD2 transmit, amongst other data, necessary signalling messages during the setup and tear-down of communication connections. In this case, the subscriber line connections VA, VB1 are ISDN subscriber connection lines and the channels CHD1, CHD2 are so-called signal channels. It is also possible for the channels CHD1, CHD2 to be control channels provided on a mobile radio telephony connection, for example, control channels of a UMTS radio telephony connection (UMTS=universal mobile telecommunications systems).

The data network INT can be, for example, the Internet, or another packet-switched network, in particular, a network which is suitable for telecommunication and is based on an Internet protocol. Of the data network INT, only gateways VGW1 and VGW2, connected to one another via a connection VINT, are shown, these representing, by way of example, other servers, routers, switches, transmission paths etc. of the data network INT which are not depicted. In this case, the gateways VGW1, VGW2 are so-called VoIP gateways (VoIP=voice over Internet protocol) via which voice communication connections can be established between the terminal TERA, serving as a source telecommunication device, and the terminal TERB, serving as a destination telecommunication device. Connections VID1 and VID2 respectively are then established between the exchanges SW1, SW2 serving the subscribers SUBA and SUBB and the gateways VGW1, VGW2.

In this case, the terminals TERA, TERB are not only connected to the data network INT via the telecommunication network XTN, but also to the gateways VGW1, VGW2 via direct connections VINA, VINB. The connections VINA, VINB are, for example, connections on a WAN or LAN (wide area network, local area network). It is also possible for other communication connections, for example, pure data and/or image telephony connections, to be set up via the gateways VGW1, VGW2.

In this case, the gateways VGW1, VGW2 comprise so-called media gateways, which serve as an interface device between the data network INT and the circuit-switched telecommunication network XTN. Media gateways can convert so-called media data, e.g. voice or image data, between a packet-switched network, e.g. the data network INT, and a circuit-switched telecommunication network, e.g. the telecommunication network XTN. Furthermore, in the embodiment example, the gateways VGW1, VGW2 serve as so-called signalling gateways which can convert signalling data, e.g. call signalling messages, between a packet-switched network and a circuit-switched telecommunication network, in which the signalling data is transmitted by, for example, the so-called central signalling system No. 7.

The gateways VGW1 and VGW2 comprise connection means, not depicted, for setting up data, voice and/or multimedia connections, as well as control means, e.g. processors, and memory means, e.g. RAM modules and hard disk drives, serving as working memories, and are each controlled by program modules under control of an operating system. In this case, the control means of the gateways VGW1 and VGW2 each execute network device program modules NPM, shown schematically in FIG. 3, which are stored in their memory means.

In this case, the terminals TERA and TERB serving as source and destination telecommunication devices are each similarly constructed and have essentially the same components, shown schematically in FIG. 1, which are explained below.

The terminals TERA, TERB are, for example, personal computers, mobile radio telephony terminals, ISDN terminals or other digital terminals. The terminals TERA, TERB comprise connection means TRTER, serving as transmitting and receiving means, which are, for example, modems, ISDN adapters or network cards. By means of the connection means TRTER, the terminals TERA, TERB can set up connections to the telecommunication network XTN. The terminals TERA, TERB additionally comprise control means CPUTR, as well as memory means MEMTR. The control means CPUTR are, for example, individual processors or processor arrangements which can execute program code of program modules which are stored in the memory means MEMTR. The memory means are, for example, hard disks or RAM modules serving as working memories. The terminals TERA, TERB additionally comprise display means DIS and input means KEY. The display means DIS comprise, for example, an LED arrangement, a screen or an LCD (liquid crystal display). The input means KEY can comprise a keyboard or a mouse. The terminals TERA, TERB additionally comprise a loudspeaker SP and a microphone MIC for voice output and voice input respectively. Upon an incoming call, the terminals TERA, TERB can output acoustic call signals via the loudspeaker SP and a ringer tone generator RING, and visual call signals via the display means DIS. Furthermore, the terminals TERA, TERB can output mechanical call signals via a vibration generator VIB, e.g. a so-called vibration alarm. The components of the terminals TERA, TERB are interconnected by connections which are not depicted.

Figure 2:
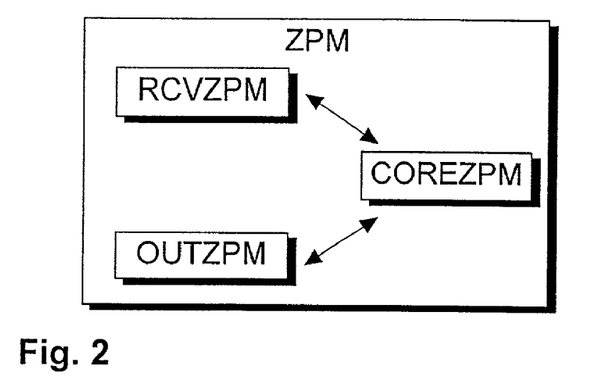
FIG. 2 shows a destination program module ZPM in schematic form.
Figure 4:
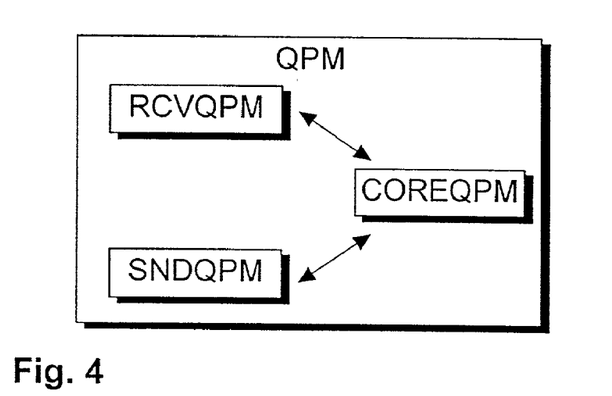
FIG. 4 shows a source program module QPM in schematic form.

Stored in the source terminal TERA is a source program module QPM, shown schematically in FIG. 4, and, in the destination terminal TERB, a destination program module ZPM, shown schematically in FIG. 2. The program code of the modules QPM, ZPM is executed by the control means CPUTR.

Of the exchange SW2, some essential components are shown by way for example, namely, a connection means TRSW, as well as a control means CPUSW and a memory means MEMSW. By means of the connection means TRSW, firstly, the exchange SW2 can set up data and voice connections to subscribers or other exchanges, e.g. the connections VB1 and VXTN. Secondly, the connection means TRSW can also set up signalling connections such as, for example, the connection VSCP2 to the service control point SCP. The control means CPUSW is a processor or a group of processors which execute program code of program modules, for example, of the network device program module NPM shown schematically in FIG. 3, which are stored in the memory means MEMSW. Under control of an operating system, the control means CPUSW controls the functions of the exchange SW by means of the program modules, thereby influencing, for example, the functions of the connection means TRSW, serving as transmitting and receiving means. The connection means TRSW, the control means CPUSW and the memory means MEMSW are interconnected by connections which are not depicted in FIG. 1. The exchange SW1 can also comprise further modules, e.g. a switching network or an interface to a network management system.

The exchange SW1 can be constructed in the same way as the exchange SW2 and, like the latter, perform the functions according to the invention which are described at a later point. However, the exchange SW1 can also be a conventional, known exchange.

The private branch exchange of the subscriber SUBB is of essentially the same construction as the exchange SW2, and therefore its components are not explained in detail. In this case, a control means CPUPB corresponds to the control means CPUSW, memory means MEMPT correspond to the memory means MEMSW and connection means TRPB, serving as transmitting and receiving means, correspond to the connection means TRSW. Under control of an operating system, the control means CPUPB controls the functions of the exchange PB by means of program modules, for example, the destination program module ZPM depicted schematically in FIG. 2, and thereby influences, for example, the functions of the connection means TRPB. By contrast with the exchange SW2, the destination program module ZPM shown schematically in FIG. 2 is stored in the destination branch exchange PB serving as a destination telecommunication device. The program code of the destination program module ZPM is executed by the control means CPUPB.

The service control point SCP comprises connection means, not depicted, for setting up data and/or voice connections, as well as control means, e.g. processors, and memory means, e.g. RAM modules and hard disk drives, serving as working memories, and is controlled by program modules under control of an operating system. In this case, the control means of the service control point SCP execute the network device program module NPM, shown schematically in FIG. 3, which is stored in a memory means.

Figure 3:
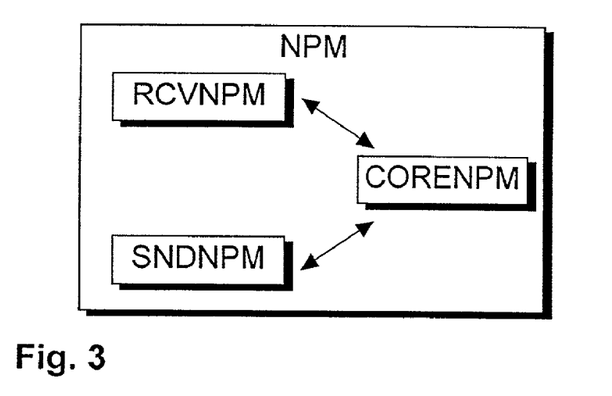
FIG. 3 shows a network device program module NPM in schematic form.

The destination program module ZPM, the source program module QPM and the network device program module NPM are generated in, for example, a programming language, for example, "C", "C++", Java or the like, and are then translated by a compiler or an interpreter into program code which can be executed by the control means CPUTR, CPUPB and CPUSW. In respect of function, the modules ZPM, QPM, NPM are represented in schematic form only and can also be configured differently in each individual case. The modules ZPM, QPM, NPM each comprise a central control unit, which is denoted by COREZPM, COREQPM and CORENPM respectively, and which calls up functions and subroutines which are described in greater detail below.

The central control units COREZPM, CORENPM of the modules ZPM, NPM control the receiving functions RCVZPM and RCVNPM respectively, which each serve as receiving means. The destination program module ZPM comprises an output function OUTZPM, serving as an output means and the network device program module NPM comprises a transmitting function SNDNPM, serving as a transmitting means.

The receiving function RCVZPM is designed to receive identification data for the identification of the subscriber SUBA, representing the caller, which is sent within a call setup signalling message upon the setup of a call connection to the destination telecommunication devices TERB, PB. The call setup signalling message is received via the connection means of the TRTER, TRPB of the destination terminal TERB and of the destination exchange PB respectively. The output function OUTZPM is designed to output the identification data or output data generated from it, as acoustic and/or visual and/or mechanical call signals, to the destination terminal TERB and to the terminals TELB1, TELB2 which, in operation, are connected to the private branch exchange PB serving as a destination telecommunication device. In the destination TERB, this output function OUTZPM controls the loudspeaker SP and the display means DIS. In the destination exchange PB, the output function OUTZPM transfers output data, generated from the identification data, to the connection means TRPB for transmission to the terminals TELB1, TELB2.

The receiving function RCVNPM is provided for receiving a request message sent by the source terminal TERA, serving as a source telecommunication device, via the connection means TRSW, for example, for receiving a request message for the setup of a call connection. The request message requests the network device to transmit to the destination telecommunication devices PB, TERB identification data for identification of the caller SUBA. The transmitting function SNDNPM is designed for transmitting the identification data within a call setup signalling message directed to the destination telecommunication device PB, TERB. For this purpose, the transmitting function SNDNPM transfers the call setup signalling message to be sent to the connection means TRSW. The destination telecommunication devices PB, TERB can then output the identification data, or output data generated from it, as acoustic and/or visual and/or mechanical call signals instead of an acoustic call tone selected by themselves.

The central control unit COREQPM of the source program module QPM controls a recording function RVCQPM, serving as a recording means, for recording identification data for call identification, which is entered, for example, by the subscriber SUBA, acting as a caller, on the source telecommunication device TERA. The recording function RVCQPM then receives, for example, via the microphone MIC and/or the input means KEY, instructions entered by the subscriber SUBA for the production of the identification data. The central control unit COREQPM additionally controls a transmitting function SNDQPM, serving as a transmitting means. By means of the connection means TRTER, the transmitting function SNDQPM sends the identification data within a call setup signalling message to the destination telecommunication devices TERB, PB, so that the latter can output acoustic and/or visual and/or mechanical call signals on the basis of the identification data.

The respective functions RCVZPM, OUTZPM; RCVNPM, SNDNPM; RCVQPM, SNDQPM of the modules ZPM, NPM, QPM can be designed solely for communication with the central control units COREZPM, CORENPM and COREQPM respectively assigned to them, as well as for direct communication and/or direct mutual function callup in each case, in which case the central control units COREZPM, CORENPM and COREQPM respectively may not be absolutely essential.

In the case of the embodiment according to the invention, several variants are possible, some of which are explained below:

A connection is to be set up from the terminal TERA, via the telecommunication network XTN, to the terminal TERB. For this, its call number RNB is entered on the terminal TERA via the input means KEY or, for example, by voice input on the microphone MIC. Via the channel CHD1, the terminal TERA sends the call number RNB to the exchange SW1 as part of a call signalling message RS1, shown schematically in FIG. 5, which is, for example, an ISDN setup message. If the call number RNB is entered on the terminal TERA, for example, as part of a so-called call initialization, in which the handset is still on-hook during dialling, or if the call number RNB originates from a call number memory of the terminal TERA, the latter sends the complete call number RNB of the subscriber SUBB in a call signalling message by means of which the desired call connection can already be set up. Otherwise, the exchange SW1 waits until the terminal TERA has sent the digits of the complete call number to the exchange SW1. In the case of the ISDN protocol, the terminal TERA sends the further digits of a call number in so-called INFO messages.

Figure 5:
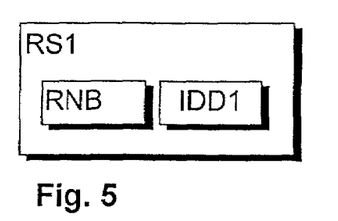
FIG. 5 shows a call signalling message RS1.

In addition to the call number RNB, the terminal TERA enters identification data IDD1 for call identification in the call signalling message RS1. In the case of the ISDN setup message, for example, the section provided for user-to-user signalling can be used for this purpose.

It is also possible for the call signalling message RS1 sent to the exchange SW1 not to contain the identification data IDD1 and for the exchange SW1 to request the terminal TERA to give the identification data IDD1, for example, to fetch it from its memory MEMTR or to request it from the subscriber SUBA.

The identification data IDD1 contains, for example, information for the generation of acoustic and/or visual call signals, for example, a call melody or a ringer sequence and/or the name of the subscriber SUBA. Any combinations of these are possible, for example, a ringer sequence and a text message concerning the urgency or the purpose of the call connection to be established can be contained in the identification data IDD1. It is also possible for the identification data IDD to contain the name of the subscriber SUBA and an instruction to the terminal TERB to convert this name into speech and output it as a call signal. Furthermore, it is also possible to specify in the identification data IDD1 that no acoustic, but only optical signals are to be output for call signalling, for example, via the display means DIS, and/or only mechanical signals, e.g. a vibration alarm, via the vibration generator VIB. A call melody can be coded in, for example, the so-called "Capella" format (file extension "*.cap") or in MP3 format (MP3 is the audio layer 3 of the MPEG-1 format used for video data compression; MPEG=Moving Picture Experts Group).

The call signalling message with the identification data is sent from the exchange SW1, via the connection VXTN, to the exchange SW2, which forwards the call signalling message to the terminal TERB via the channel CHD2, as well as to the exchange PB which is likewise connected to the subscriber connection line VB1, VB21.

In the case of a call signalling message in which there is no identification data, the terminal TERB and the exchange would then output standard ringer tones via the terminals TELB1, TELB2 in order to signal the incoming call. For this, the terminal TERB would activate, for example, the loudspeaker SP or the ringer tone generator RING. The exchange PB would send calls signals to the terminals TELB1, TELB2 whose ringers, for example, control rhythm for incoming external calls.

In this case, however, the identification data IDD1 contains individual information appropriate for the identification of the subscriber SUBA so that, for example, the terminal TERB reads out the identification data IDD1 from the call signalling message RS1 and outputs on the loudspeaker SP a call melody which has been predefined in the identification data IDD1 by the subscriber SUBA.

The exchange PB sends the call signals to the terminals TELB1, TELB2, not in the usual ringer rhythm for incoming external calls, but in a ringer rhythm which represents the subscriber SUBA and which is predefined through the identification data IDD1, which it generates as output data from the identification data IDD1.

It is also possible for the terminals TELB1, TELB2 to be mobile DECT terminals and for the branch exchange PB to be a DECT base station and exchange assigned to them. The branch exchange PB concludes from the identification IDD1, for example, that the terminals TELB1, TELB2 are to output only a vibration alarm for the purpose of call signalling. As output data, therefore, the branch exchange PB forms from the identification data IDD1 messages in which the terminals TELB1, TELB2 are instructed to output a vibration alarm for call signalling. The vibration alarm can additionally be output by the terminals TELB1, TELB2 in a rhythm which is predefined by the identification data IDD1.

If the terminal TERB or one of the terminals TELB1, TELB2 accepts the call connection, the respective terminal sends an acceptance message to the exchange SW2, for example, a so-called CONNECT message in the case of the ISDN protocol. The telecommunication network XTN then sets up, in known manner, the communication connection, requested by the call signalling message RS1, between the respective terminal TERB, TELB1, TELB2 of the subscriber SUBB and the terminal TERA. In this case, the communication connection is set up on the channels CHB1, CHB2 provided for useful data.

The subscriber SUBA can enter the identification data on the terminal TERA individually in each case upon the setup of a respective call connection, via the input means KEY and/or the microphone MIC. It is also possible for the terminal TERA to automatically insert the identification data in the call signalling message. For this purpose, the identification data could be stored in, for example, its memory MEMTR and fetched, e.g. by the source program module QPM, upon each setup of a call connection. The same identification data can then be provided for each call connection originating from the terminal TERA. It is also possible for the identification data to be stored in the memory means MEMTR in a destination-specific manner, e.g. in a table with an assignment of identification data to destination address for the respective communication connection. For example, a first identification data representing, for example, a first call melody, can be provided for a call connection to the terminal TERB, and a second identification data representing, for example, a second call melody, for a call connection to the terminal TE3.

In a further variant, a communication connection is set up, not via the telecommunication network XTN, but via the data network INT. The terminal TERA first sets up a connection to the data network INT via the telecommunication network XTN, in this case, a connection to the gateway VGW1 via the exchange SW1 and the connections CHB1, VID1. It is also possible for a direct connection VINA to be set up between the gateway VGW1 and the terminal TERA, not routed via the telecommunication network XTN, which is routed, for example, via a radio link, via a power cable as a so-called powerline connection or via a LAN.

The terminal TERA sends to the gateway VGW1 a call signalling message which serves as a request message for the setup of a VoIP communication link to the terminal TERB via the data network INT.

Various control protocols can also be provided for the setup and control of the VoIP communication connection, i.e., for the said call signalling message, for example, the media gateway control protocol known by the abbreviation MGCP or the media gateway control protocol known by the abbreviation MEGACOP, both of which are standardized by the IETF (Internet Engineering Task Force). One or more call agents (not depicted) can be provided in the data network INT for the purpose of setting up and/or controlling the connection. The call agents can also be provided in the gateways VGW1, VGW2.

In the case of the MEGACOP, the terminal TERA sends to the gateway VGW1, for example, a so-called ADD command containing the identification data for call identification. The ADD command, or a message generated from it, is passed from the data network INT to the destination telecommunication devices, in this case, to the terminal TERB and/or the private branch exchange PB. The latter than output call signals in dependence on the identification data, in the manner described above. This ADD command is an action on an object which can be, for example, the terminal TERB as such or the destination program module ZPM. It is also possible for the ADD command to generate the necessary object if the latter is not present. For example, the destination program module ZPM, or another object which converts the identification data into acoustic and/or visual and/or mechanical call signals could be generated by the ADD command.

In the case of the MGCP, the terminal TERA sends to the gateway VGW1 and/or to a call agent (a so-called gatekeeper), not depicted, a so-called NOTIFY command, for example, containing the respective identification data for call identification. Instantiated in the data network INT, for example, in the gateways VGW1 and/or VGW2 or in another network device, are so-called "call agents" which can receive the NOTIFY command and transmit it between each other as a so-called CRCX message. In this case, the gateways VGW1, VGW2 each form instances of call agents, also called gatekeepers. The gateway VGW1 receives the NOTIFY command with the call identification data from the terminal TERA and forwards it as a CRCX message, via the connection VINT, to the gateway VGW2. From the CRCX message containing the identification data, the latter in turn forms a NOTIFY command, containing the identification data, and sends it to the terminal TERB and/or to the exchange PB. The latter can be designed as a VoIP interface device or VoIP gateway which is can convert VoIP usefuldata messages and/or VoIP signalling messages into, for example, analog signals or DECT messages for the terminals TELB1, TELB2, and vice versa, so that the latter do not need to be "VoIP-capable".

However, the identification data for call identification does not necessarily have to be sent by a source telecommunication device, but can also be entered in a respective call signalling message by a network device, e.g. the exchange SW2 or the service control point SCP, the gateways VGW1, VGW2 or other call agents, gatekeepers or the like. Furthermore, such a network device can supplement identification data sent by a source telecommunication device with further, additional identification data.

Figure 9:
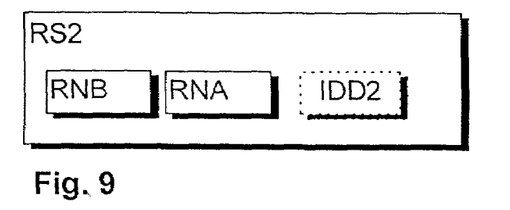
FIG. 9 shows a call signalling message RS2.

For example, a call signalling message RS2, shown in FIG. 9, can be sent first without the identification data IDD2 from the terminal TERA to the exchange SW1 and forwarded by the latter to the exchange SW2. The call signalling message RS2 forms a request, directed to the telecommunication network XTN, to send identification data. The exchange SW2 then, e.g. under control of the network device program module NPM, supplements the identification data IDD2 before it sends the call signalling message RS2 to the terminal TERB and/or the exchange PB. The exchange SW2 ascertains the identification data IDD2, for example, on the basis of a call number RNA of the subscriber SUBA contained in the call signalling message RS1. For this purpose, for example, an assignment of source call numbers to identification data is stored in the exchange SW2. Such an assignment can be loaded into the exchange SW2, e.g. as a subscriber profile of the subscriber SUBA, by, for example, a network management system, not depicted, and/or configured by the subscriber SUBA.

In a variant of the above embodiment, the identification data IDD2 is not stored in the exchange SW2, but in the service control point SCP. Upon receipt of the call signalling message RS2, the exchange SW2 requests the necessary identification data IDD2 from the service control point SCP and, for this purpose, sends to the latter, e.g. by means of an INAP (intelligent network application part) message, a request containing the call number RNA. The service control point SCP then, for example, under control of the network device program module NPM, transmits the necessary identification data IDD2, e.g. contained in configuration data of the service control point SCP, which the exchange SW2 then enters in the call signalling message RS2.

However, the identification data IDD2 could also be already entered in the call signalling message RS2 by the exchange SW1 in which, for example, a network device program module NPM is installed for this purpose. Furthermore, the exchange SW1 could also request the identification data IDD2 from the service control point SCP, in the manner described above.

The same also applies to the gateways VGW1, VGW2, which can each enter identification data in call signalling messages by means of their network device program modules NPM.

It is also possible for the gateways VGW1, VGW2 and/or the exchanges SW1, SW2 to enter identification data in the case of call signalling messages sent from the terminals TERB, TE2, TE3 directed to the subscriber SUBA and to evaluate for this purpose, for example, the source addresses given in the respective call signalling messages, e.g. their call numbers or Internet protocol addresses.

In a convenient variant, the exchanges SW1, SW2 and/or the gateways VGW1, VGW2 and/or the service control point SCP provide the subscribers SUBA, SUBB with a user interface for setting individual configurations of call identification data. For this purpose, for example, a connection is set up between the terminal TERA and the gateway VGW1 or the exchange SW1, if necessary by means of the data network INT. The gateway VGW1 and/or the exchange SW1 then send data which can be displayed by the terminal by, for example, a so-called browser, e.g. a Netscape Navigator or a Microsoft Explorer. A mask, for example, is then displayed, in which the subscriber SUBA in each case enters a destination address of a communication partner, e.g. the call number or the Internet address of the subscriber SUBB, as well as the optical and/or acoustic signalling required for the respective communication partner. It is also possible for the subscriber SUBA always to configure the same call identification for all call connections from his terminal TERA. The identification data is then assigned to the source address of the call connections, e.g., the call number of the terminal TERA. In a simple variant, each destination telephone dialled from the terminal TERA then rings with the same call melody or the same ringer sequence. The data entered in the mask by the subscriber SUBA is then sent by the terminal TERA to the gateway VGW1 and/or the exchange SW1, where it is stored.

It is also possible that, due to its extent, the identification data to be sent as part of a call signalling cannot be sent in full in a single call signalling message. The source telecommunication device, or a network device entering the identification data in the call signalling, segments the identification data and sends it in several call signalling messages or in one or more subsequent messages following a first call signalling message. For example, the terminal TERA sends first identification data IDD11, in a call signalling message RS11 shown in FIG. 6, to the terminal TERB and then subsequent identification data IDD12, in a call signalling message RS12. The call signalling message RS11 contains an identifier SQ which indicates the call signalling message RS12 to follow. In the case of the ISDN protocol, the call signalling messages RS11, RS12 are provided, for example, with the message type "SEGMent". It is also possible for a user-to-user signalling message, containing identification data, to be sent instead of the call signalling message RS12 or subsequent to it.

Figure 6:
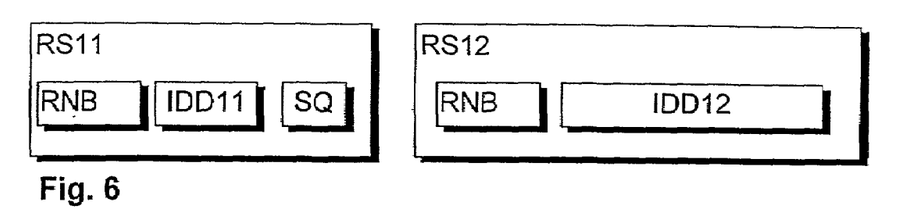
FIG. 6 shows call signalling messages RS11, RS12.

The telecommunication network XTN can already set up a communication connection between the terminals TERA, TERB on the basis of the call signalling message RS11. Furthermore, on the basis of the identification data IDD11, the terminal TERB can already output call signals, e.g. a ringer melody, immediately after receiving the call signalling message RS11. If the identification data IDD12 has not yet arrived following the output of the identification data IDD11, the terminal TERB can, for example, repeat the output of the identification data IDD11. It is also possible, in principle, for the terminal TERB to wait for the arrival of complete identification data in each case, for example, in this case, the call signalling messages RS11, RS12, before it commences output of the call signals defined by the identification data IDD11, IDD12.

It is also possible for the terminal TERA, as a source telecommunication device, to send the call signalling message RS11 and for the call signalling message RS12 to be sent subsequently by a network device, e.g. the exchange SW2.

Figure 7:
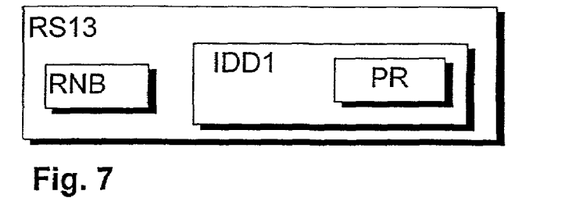
FIG. 7 shows a call signalling message RS13.

The call signalling message RS13 shown in FIG. 7 is a modification of the call signalling message RS1 from FIG. 5, the identification data IDD1 indicating, by means of a priority identifier PR, the priority of the requested call connection. The terminal TERB evaluates the priority identifier PR for the purpose of outpuffing the call signals defined by the identification data IDD1, with the incoming call being signalled particularly loudly, for example, in the case of a high priority, e.g. in the case of an urgent call.

Figure 8:
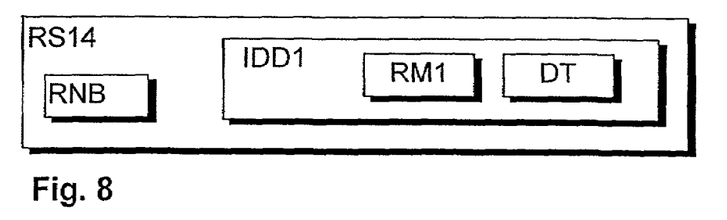
FIG. 8 shows a call signalling message RS14.

The call signalling message RS14 shown in FIG. 8 is likewise a modification of the call signalling message RS1 from FIG. 5. In this variant, the identification data IDD1 contains an index RM1 which indicates a call melody stored in the terminal TERB, as well as a data type identifier DT which indicates that, on the requested call connection, data is to be transmitted only in the background from the terminal TERA to the terminal TERB. The terminal TERB then outputs, via the loudspeaker SP, the call melody indicated by the index RM1, the call melody being output quietly due to the low urgency indicated by the data type identifier DT.

The call melody indicated by the index RM1 can be configured, for example, by the subscriber SUBB in the terminal TERB or sent from the terminal TERA to the terminal TERB.

It is also possible for a filter criterion to be stored in the terminal TERB and for the latter to compare received identification data with the filter criterion. For example, it could be defined as a filter criterion in the terminal TERB that no calls are to be output if the data identifier DT is received.

Further variants of the invention are easily feasible:

The exchange SW1 designed according to the invention and the gateway VGW1 designed according to the invention could be combined to form a common device.

Furthermore, the exchange SW1 acting as a service switching point (SSP) and the service control point SCP could be combined to form a combined device, a so-called service switching and control point (SSCP).

The subscriber connection lines VA, VB1, VB2 and VB3 could also be designed as DSL (digital subscriber line) or powerline subscriber connection lines (=telecommunication connections via the electrical power network). Furthermore, they could be WLL connections (WLL=wireless local loop).

It is also possible for the terminals TERA, TERB to be directly connected to the data network INT, for example, directly to the gateways VGW1, VGW2.

The gateways VGW1, VGW2 could be integrated into terminals or private branch exchanges, for example, the gateway VGW1 could be integrated into the terminal TERB or into the exchange PB.

The exchanges SW1 and/or SW2 could also be so-called mobile switching centres (MSC) of a mobile radio telephony network and the terminals TERA, TERB, TE2, TE3 connected to them could be mobile radio telephony terminals.

The terminal TERA and/or the terminal TERB and/or the exchange PB could each comprise a destination program module ZPM and a source program module QPM.

The gateways VGW1, VGW2, or at least a portion of their functions, e.g. the functions in respect of the VoIP protocols, for example, the above-mentioned MGCP and/or the MEGACOP, could be integrated into the terminals TERA and/or TERB.

The destination program module ZPM and the source program module QPM could be downloaded from network devices of the telecommunication network XTN and/or of the data network INT into the respective destination and/or source telecommunication devices, e.g. from the exchanges SW1, SW2 and/or the gateways VGW1, VGW2 and/or the service control point SCP into the terminals TERA, TERB and/or into the branch exchange PB.

It is understood that any combinations of the measures and arrangements stated in the claims and in the description are possible.

What is claimed is:

1. A method for identifying an incoming call of a subscriber calling a destination terminal via a telecommunication network, said method comprising:
   selecting identification data by the caller only upon setup of each call connection;
   transmitting to the destination terminal said identification data identifying said caller;
   receiving said identification data only within a call setup signaling message at said destination terminal;
   replacing preprogrammed acoustic call tones of said destination terminal, with said identification data, or data generated from said identification data; and
   outputting at said destination terminal only said identification data as acoustic call signals.

2. Method according to claim 1, wherein a source telecommunication device, in particular, a source terminal, of the caller sends the identification data.

3. Method according to claim 1, characterized in that a network device of the telecommunication network, which is an integrated services digital network, a mobile radio telephony network or a data network, sends the identification data to the destination terminal.

4. Method according to claim 3, characterized in that a source telecommunication device, assigned to the caller, sends a request to the network device to send the identification data.

5. Method according to claim 1, wherein the call signalling message or the identification data contains a quality identifier for the respective call connection, in particular, a priority identifier for the call connection and/or a type identifier of information to be sent in the course of the call connection.

6. Method according to claim 1, wherein the identification data is transmitted to the destination terminal in segmented form in the call setup signalling message and in at least one subsequent message.

7. Method according to claim 6, wherein the destination terminal commences the output of the identification data contained in the call setup signalling message when the identification data is still incomplete, before receiving the at least one subsequent message.

8. Method according to claim 1, wherein the destination terminal activates a ringer tone generator and/or a loudspeaker for the purpose of rendering the identification data.

9. Method according to claim 1, wherein the destination terminal deduces a call melody and/or a ringer sequence from the identification data.

10. Method according to claim 1, wherein the destination terminal filters the received identification data on the basis of at least one predefined criterion and, in dependence on the respective result, outputs the identification data as the acoustic call signals.

11. Method according to claim 1, wherein a private branch exchange is used as the destination terminal, the destination terminal generates, from the identification data from another terminal connected to it, output data which can be output and containing a ringer tone sequence and/or a call melody, and the destination terminal sends the output data to the other terminal.

12. Destination program module for identifying the call of a subscriber calling, via a telecommunication network, a destination terminal of a called subscriber, which module contains program code which can be executed by a control means of the destination terminal, which module comprises receiving means for receiving identification data, for the identification of the caller, selected and sent by the caller upon each setup of a call connection, and which module comprises output means for output of the identification data, wherein the receiving means are designed to receive the identification data only within each call setup signalling message, and the output means are designed to output the identification data, or output data generated from it, to the destination terminal as acoustic and/or visual and/or mechanical call signals to replace a preprogrammed acoustic call tone of the destination terminal.

13. Memory means, in particular, diskette or CD-ROM, digital versatile disc, hard disk drive or the like, with a destination program module according to claim 12 stored on it.

14. A destination terminal, for identifying the call of a subscriber calling via a telecommunication network, which comprises receiving means for receiving identification data, for the identification of the caller, sent by the caller upon each setup of a call connection, and which comprises output means for output of the identification data, wherein the receiving means are designed to receive the identification data only within each call setup signalling message, and the output means are designed to output the identification data, or output data generated from it, to the terminal as acoustic and/or visual and/or mechanical call signals to replace a preprogrammed acoustic call tone of the destination terminal.

15. Network program module for a network device, in particular, for an exchange and/or for a service control point of an intelligent network and/or for a gateway to a data network, for identifying the call of a subscriber calling, via a telecommunication network, a destination terminal of a called subscriber, which
   contains program code which can be executed by a control means of the network device,
   comprises receiving means for receiving a request message, sent from a source telecommunication device of the caller, by which the network device is requested to transmit, to the destination terminal, identification data, selected by the caller, for identification of the caller, the destination terminal being able to output the identification data, or output data generated from it, as acoustic and/or visual and/or mechanical call signals to replace a preprogrammed acoustic call tone of the destination terminal, and
   comprises transmitting means for sending the identification data only within a call setup signalling message directed to the destination terminal.

16. Memory means, in particular, diskette or CD-ROM, digital versatile disc, hard disk drive or the like, with a network program module according to claim 15 stored on it.

17. Network device, in particular, exchange, service control point, of an intelligent network or gateway to a data network, for identifying the call of a subscriber calling, via a telecommunication network, a destination telecommunication device of a called subscriber, which
   comprises receiving means for receiving a request message, sent from a source telecommunication device of the caller, by which the network device is requested to transmit to, at least one destination telecommunication device of a called subscriber, identification data, selected by the caller, for identification of the caller, the destination telecommunication device being able to output the identification data, or output data generated from it, as acoustic and/or visual and/or mechanical call signals to replace a preprogrammed acoustic call tone of the destination telecommunication terminal, and comprises transmitting means for sending the identification data only within a call setup signalling message directed to the destination terminal.

18. Source program module for identifying the call of a subscriber calling, via a telecommunication network, a destination terminal of a called subscriber, which contains program code which can be executed by a control means of a source telecommunication device, in particular, of a source terminal, comprises recording means for recording identification data, for identifying the call of the caller, which is selected and entered by the caller on the source telecommunication device for each call, and comprises transmitting means for sending the identification data, selected by the caller, only within each call setup signalling message directed to the destination terminal, the destination terminal being able to output the identification data, or output data generated from it, as acoustic and/or visual and/or mechanical call signals to replace a preprogrammed acoustic call tone of the destination telecommunication device.

19. Memory means, in particular, diskette or CD-ROM, digital versatile disc, hard disk drive or the like, with a source program module according to claim 18 stored on it.

20. Source telecommunication device for identifying the call of a subscriber calling, via a telecommunication network, a destination terminal of a called subscriber, which comprises recording means for recording identification data, for identifying the call of the caller, selected and entered by the caller, and comprises transmitting means for sending the identification data, selected by the caller, only within each call setup signalling message directed to the destination terminal, the destination terminal being able to output the identification data, or output data generated from it, as acoustic and/or visual and/or mechanical call signals to replace a preprogrammed acoustic call tone of the destination terminal.

* * * * *